United States Patent [19]

Abukawa et al.

[11] Patent Number: 4,823,037
[45] Date of Patent: Apr. 18, 1989

[54] DC ELECTRIC MOTOR HAVING FIELD POLES OF PERMANENT MAGNET

[75] Inventors: Toshimi Abukawa, Hitachiota; Kazuo Tahara, Hitachi; Noriyoshi Takahashi, Hitachi; Toshio Tomite, Katsuta, all of Japan

[73] Assignee: Hitachi, Ltd., Tokyo, Japan

[21] Appl. No.: 113,511

[22] Filed: Oct. 28, 1987

[30] Foreign Application Priority Data

Nov. 5, 1986 [JP] Japan .................. 61-261960

[51] Int. Cl.⁴ ............................. H02K 23/18
[52] U.S. Cl. .................... 310/230; 310/154; 310/185; 318/292
[58] Field of Search ............. 310/46, 298, 177, 258, 310/229, 68 B, 230, 233, 234, 239, 241, 154, 254, 185, 186, 261; 290/38 R; 318/361, 292

[56] References Cited

U.S. PATENT DOCUMENTS

| 4,095,155 | 6/1978 | Brooks | 310/230 |
|---|---|---|---|
| 4,338,536 | 7/1982 | Halliday | 310/230 |
| 4,469,969 | 9/1984 | Tomite | 310/154 |
| 4,471,252 | 9/1984 | West | 310/254 |
| 4,491,756 | 1/1985 | Tomite | 310/154 |
| 4,507,565 | 3/1985 | Hamano | 310/230 |
| 4,536,669 | 8/1985 | Morishita | 310/230 |
| 4,639,625 | 1/1987 | Abukawa | 310/254 |
| 4,687,608 | 8/1987 | Eino | 310/154 |

FOREIGN PATENT DOCUMENTS

| 0096868 | 12/1983 | European Pat. Off. | 310/177 |
|---|---|---|---|
| 0134475 | 7/1984 | European Pat. Off. | |
| 0035721 | 10/1973 | Japan | 310/154 |
| 0059465 | 7/1982 | Japan | |
| 0002554 | 4/1984 | Japan | |
| 0156145 | 1/1985 | Japan | |
| 0113642 | 10/1985 | Japan | |
| 0219951 | 3/1986 | Japan | |
| 0173654 | 12/1986 | Japan | |
| 1277876 | 6/1972 | United Kingdom | 310/154 |

Primary Examiner—R. Skudy
Attorney, Agent, or Firm—Antonelli, Terry & Wands

[57] ABSTRACT

A DC electric motor which comprises: a reversibly rotatable rotor having an armature core, an armature winding and a commutator; a stator having a yoke and a plurality of field poles provided on an inner circumference of the yoke and each having a permanent magnet and an auxiliary pole; and brush means including a plurality of brushes arranged to be slidably electrically conductively in contact with the commutator; in which the auxiliary pole of each of the field poles is disposed at an exit side of the field pole in the normal foward rotating direction of the rotor; each of the brushes is held movably between a first position corresponding to a position near a geometrical neutral point between a pair of adjacent field poles and a second position corresponding to a position separated at the maximum by an electrical angle of 90 degrees from the geometrically neutral point reversely to the normal rotating direction, and each of the brushes is fixed in the vicinity of the second position in normal use.

7 Claims, 4 Drawing Sheets

F I G. 3
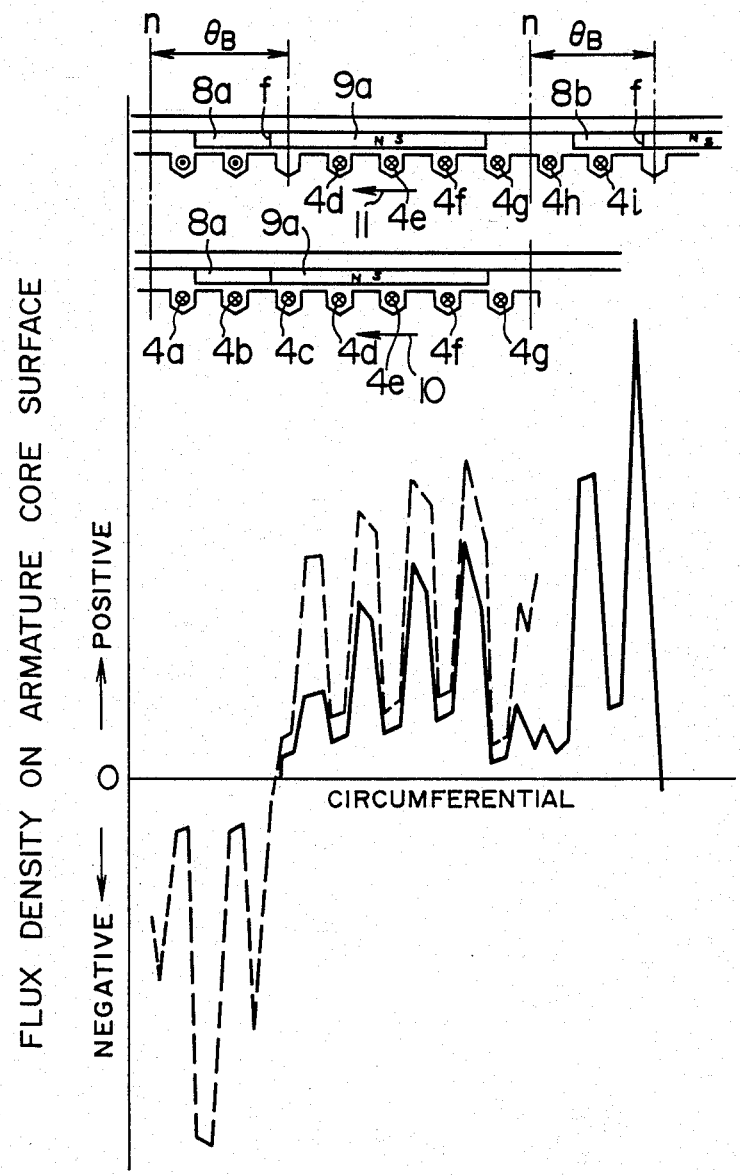

DC ELECTRIC MOTOR HAVING FIELD POLES OF PERMANENT MAGNET

BACKGROUND OF THE INVENTION

The present invention relates to a DC motor having field poles each including a magnet pole of a permanent magnet and an auxiliary pole of a magnetizable material of high permeability such as soft steel.

As disclosed, for example, in Japanese patent publication No. 48-35721 published on Oct. 30, 1973, a DC electric motor having field poles of a permanent magnet is known in which the permanent magnet of each pole is partially replaced by an auxiliary pole of a magnetizable material of high permeability, such as soft steel to thereby provide the DC motor with series-wound characteristics. In the DC motor of this type, each auxiliary pole is disposed at the side of the associated field pole on which the armature reaction acts to produce magnetization effect, i.e. to increase the magnetic fluxes flowing therethrough, or in other words each auxiliary pole is disposed at the entry side of the associated field pole in the direction of rotation of the motor. Therefore, when the motor is reversely rotated, each auxiliary pole is disposed at the side of the associated field pole on which the armature reaction acts to produce demagnetization effect, i.e. to decrease the magnetic fluxes flowing therethrough so that the torque produced by the motor becomes smaller as the armature current becomes higher. Accordingly, the motor of this type is practically used for rotation only in one direction.

The above Japanese patent publication No. 48-35721 discloses a specific example in which the auxiliary pole is disposed at the side of the associated field pole on which the armature reaction acts to provide the demagnetization effect. However, this example is relating to a DC generator to be used as an electric power source for welding and aimed at providing the DC generator with a drooping characteristic of its voltage with respect to its load current, unlike the DC motor of the present invention having series-wound characteristics.

SUMMARY OF THE INVENTION

An object of the present invention is to provide a DC electric motor having field poles of permanent magnets, which is normally used to rotate in one forward direction and can be used, if desired, to rotate in the reverse direction, while it provides series-wound characteristics when it rotates in either direction.

The DC electric motor according to the present invention comprises: a rotor having an armature core, an armature winding and a commutator; a stator having a yoke and a plurality of field poles formed on the inner circumference of the yoke; sets of brushes arranged to slidably contact with the commutator so as to make electrical conduction therebetween, each of the field poles being constituted of a permanent magnet and an auxiliary pole, the auxiliary pole being disposed at the side of the associated field pole on which the armature reaction acts to give demagnetization effect in the rotation of forward direction or in other words each auxiliary pole is disposed at the exit side of the associated field pole in the direction of forward rotation, each of the brushes being mounted so as to be movable between a position near to a geometrically neutral point of a pair of adjacent field poles and another position spaced by an electrical angle of 90 degrees or less from the geometrically neutral point in the direction of reverse rotation.

In this specification, the term "geometrical" is used in the meaning of "dimensionally" regardless of electromagnetic characteristics, and therefore the words "a geometrically neutral point of a pair of adjacent field poles" means "a dimensional center of a gap between a pair of adjacent field poles". The term "an electrical angle" means "an angle measured by a scale in which a circumferential angle covering a pair of adjacent field poles, i.e. N and S poles is scaled by 360 degrees". For example, in the case of a four-pole motor, a geometrical angle of 90 degrees is equivalent to an electrical angle of 180 degrees. In this specification, an electrical angle is referred to as "an electrical angle" as it is, while a geometrical angle is referred to merely as "an angle".

In a DC electric motor having field poles of permanent magnets, if each auxiliary pole is disposed at the side of the associated field pole where the armature reaction acts to reduce the magnetic fluxes by the field pole, the flux distribution of each field pole receives a demagnetization effect on the auxiliary poles due to the armature reaction. Assume now that a permanent magnet A and an auxiliary pole A constitute one field pole A in a manner as described above. If the direction of flux generated by the permanent magnet A is forward, the flux generated through the auxiliary pole A due to the armature current is in the reverse direction. However, if consideration is made with respect to another field pole B adjacent to the field pole A in the direction of reverse rotation, the flux generated through the auxiliary pole B due to the armature current is in the forward direction. In short, the auxiliary pole B generates flux in the same direction as that generated by the permanent magnet A.

Thus, with respect to each of the field poles, the direction of flux generated by the permanent magnet is reverse to the direction of flux generated through the auxiliary pole by the armature reaction, and a position where the direction of resultant flux by the permanent magnet and the auxiliary pole changes is at the electrically neutral axis. Accordingly, it is preferable to dispose each brush at this position, that is, the electrically neutral axis. However, the electrically neutral axis changes with a load current because the flux generated by the auxiliary pole changes with the load current. Generally, the brush is disposed at a position shifted by a predetermined angle in the direction of reverse rotation from a radially extending geometrical boundary between the permanent magnet and the auxiliary pole. The angle to be shifted varies depending on the electrical characteristics of the motor and the load current. The geometrical boundary between the permanent magnet and the auxiliary pole is clearly determined in the case where they are in side-to-side contact in a plane extending radially. However, in the case where they are not simple in shape, the geometrical boundary cannot be determined clearly. In practice, the positions of respective brushes are experimentally determined so as to make the torque as produced maximum and the degree of sparks as less as possible.

When each of the brushes is disposed in the vicinity of the electrically neutral point in such a manner as described above, the currents in the armature coils connected between positive and negative brushes are in the same direction, and the flux effective to generate a torque by the electromagnetic action in cooperation with those coil currents is the sum of the flux due to the permanent magnet of the field pole and the flux through the auxiliary pole of another field pole adjacent to the above-mentioned field pole due to the armature reaction. Since these fluxes are in the same direction, they act additively in torque generation. The flux through the auxiliary pole increases in proportion to increase in the armature current. Accordingly, the torque increases with increase of the armature current to thereby provide series-wound characteristics enough to generate large torque with a large current.

BRIEF DESCRIPTION OF THE DRAWINGS

FIG. 3 is a diagram showing the distribution of field pole flux density acting on armature coils when the DC electric motor of FIG. 1 embodiment is operated in the forward direction comparatively in the case where each of brushes is disposed at a position shifted in the direction of reverse rotation from a geometrically neutral point between a pair of field poles according to the invention and in the case where each of brushes is disposed at a geometrically neutral point like the prior art;

DESCRIPTION OF THE PREFERRED EMBODIMENTS

Figure 1:
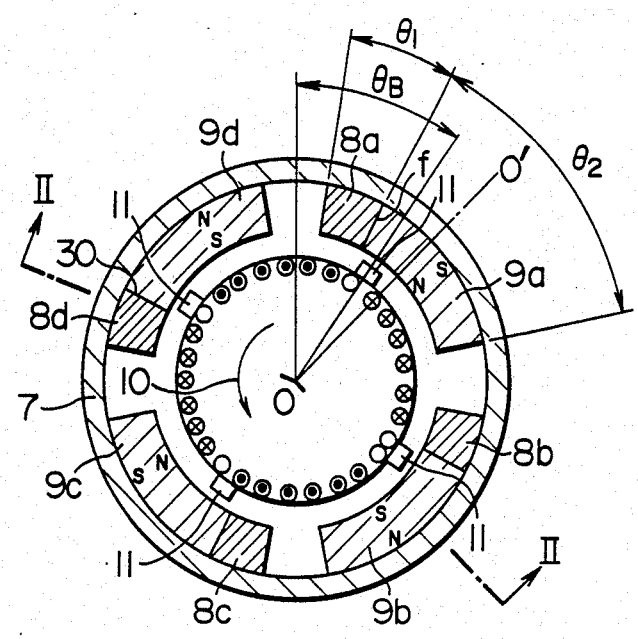
FIGS. 1 and 2 are cross sections showing the structure of an embodiment of the DC electric motor according to the present invention, and respectively being taken along the line I—I in FIG. 2 and the line II—II in FIG. 1.
Figure 2:
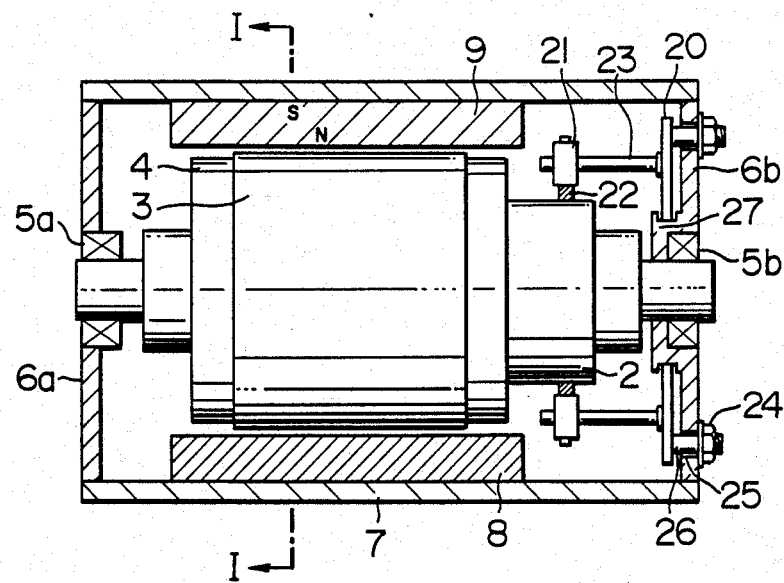

An embodiment of the present invention will be described with reference to the drawings. FIG. 1 is a radially sectional view of a four-pole electric motor of a permanent-magnet field system provided with auxiliary poles, and FIG. 2 is an axially sectional view of the same. In FIG. 2, a rotor is provided with a rotary shaft 1, a commutator 2 formed on the shaft 1, and an armature constituted by an armature core 3 mounted on the shaft 1 and a winding 4 wound on the armature core 3. The rotor is supported at the opposite ends of the shaft 1 by end brackets 6a and 6b of a stator through bearings 5a and 5b respectively. The end brackets 6a and 6b are fixed to a cylindrical yoke 7. Four field poles are formed on the inner circumference of the cylindrical yoke 7. The four field poles are respectively provided with auxiliary poles 8a–8d, generally designated by reference numeral 8, of magnetizable material, such as for example soft steel, and permanent magnet poles 9a–9d, generally designated by reference numeral 9, disposed circumferentially adjacently to the respective auxiliary poles 8a–8d.

The four auxiliary poles 8a, 8b, 8c and 8d are circumferentially equidistantly disposed. $\theta_1$ represents the circumferential angular width of each auxiliary pole as shown in FIG. 1 with respect to the auxiliary pole 8a by way of example.

The four permanent magnet poles 9a, 9b, 9c and 9d are circumferentially equidistantly disposed. $\theta_2$ represents the circumferential angular width of each permanent magnet pole as shown in FIG. 1 with respect to the permanent magnet pole 9a by way of example.

The auxiliary pole and the permanent magnet in each of the field poles are in contact with each other on an interface or boundary 30 included in a plane containing the rotation axis O of the rotor and extending in the radial direction.

In FIG. 1, an arrow 10 indicates the direction of normal or forward rotation of the rotor of the motor in this embodiment, and 11 shows an illustrative position of each brush relative to the armature coil directly connected to the commutator segment with which the brush is in contact. Thus, it should be noted that 11 does not show the geometrical position of each brush shown in FIG. 2, but rather indicates a position of the armature coil to which each brush is electrically connected through the commutator segment just into contact with that brush. Each of brushes is located at a position corresponding to an angular position 11 circumferentially shifted by an angle of $\theta_B$ in the direction of reverse rotation from a geometrically neutral point between a pair of adjacent field poles. In FIG. 1, the angle $\theta_B$ that is an angle between the geometrically neutral point between the field pole including the auxiliary pole 8d and the permanent magnet 9d and the adjacent field pole including the auxiliary pole 8a and the permanent magnet 9a indicates a position which is shifted from the geometrical neutral point beyond a circumferentially boundary f where the auxiliary pole 8a and the permanent magnet 9a contact with each other and toward a position on the geometrical center line O-O' of the field pole including the auxiliary pole 8a and the permanent magnet 9a.

In the following, the position of the brush and the flux density distribution under the field pole, which are the important features of the present invention, are described in detail. FIG. 3 shows the flux density distribution patterns on the surface of the armature core in the loaded condition when each of brushes is disposed at a geometrically neutral axis between a pair of field poles and when disposed at an electrically neutral point, respectively.

The upper half and the lower half of FIG. 3 commonly use the abscissa to represent a circumferential position on the armature surface. The upper half shows the development of field poles and the direction of current noted thereon, and the lower half shows the flux density distribution patterns in each case.

The vertical line n in the upper half represents a geometrically neutral point between a pair of adjacent field poles, and the line f represents a boundary between the permanent magnet pole and the auxiliary pole in each field pole.

If each of the brushes is disposed at a position corresponding to the aforementioned neutral point n like in the prior art, the current in each of coils 4a to 4g is directed from the front of the paper to the rear thereof ($\oplus$ direction) in the case where the auxiliary pole has a demagnetization action due to the armature reaction. Accordingly, the generated armature reaction serves as a demagnetization action or in other words the direction of the generated armature reaction is reversed to the direction of magnetization by the permanent magnet 9a. Accordingly, the flux density under the auxiliary pole 8a in the field pole is distributed in a negative direction. The flux quantity of the field pole distributed within the armature coils 4a to 4g relating to torque generation is the sum of the flux quantity of the auxiliary pole 8a and the flux quantity of the permanent magnet 9a. Consequently, as shown by the broken line in the lower half of FIG. 3, the resulting flux quantity decreases in proportion to the armature current so that series winding characteristics cannot be attained.

In this embodiment of the present invention, each of the brushes is disposed at a position corresponding to an angular position shifted from the neutral point n by an angle $\theta_B$. More particularly, each brush is disposed at a position corresponding to an electrically neutral point which is shifted from the geometrically neutral point n between a pair of adjacent field poles by the angle $\theta_B$ in the direction of reverse rotation beyond the boundary f where the auxiliary pole 8a and the permanent magnet 9a circumferentially contact with each other. As the result, the armature coils corresponding to one pole contributing to torque generation are composed of coils 4d, 4e, 4f and 4g facing or near to the permanent magnet of one field pole and coils 4h and 4i facing or near to the auxiliary pole of adjacent field pole as shown in FIG. 3. The current direction in each of these coils 4d–4i is from the front of the paper to the rear thereof. Accordingly, the flux quantity acting on those coils 4d to 4i is the sum of the flux quantity of the permanent magnet 9a of the one field pole and the flux quantity of the auxiliary pole 8b of the adjacent field pole. The flux of the permanent magnet 9a slightly decreases due to the demagnetization effect of the armature reaction, but the flux density distribution is positive. Because the current in each of the coils 4d to 4i is directed from the front of the paper to the rear thereof, the flux quantity of the auxiliary pole 8b increases in proportion to the armature current due to the armature reaction and the flux direction thereof is the same as that of the permanent magnet 9a.

Figure 4:
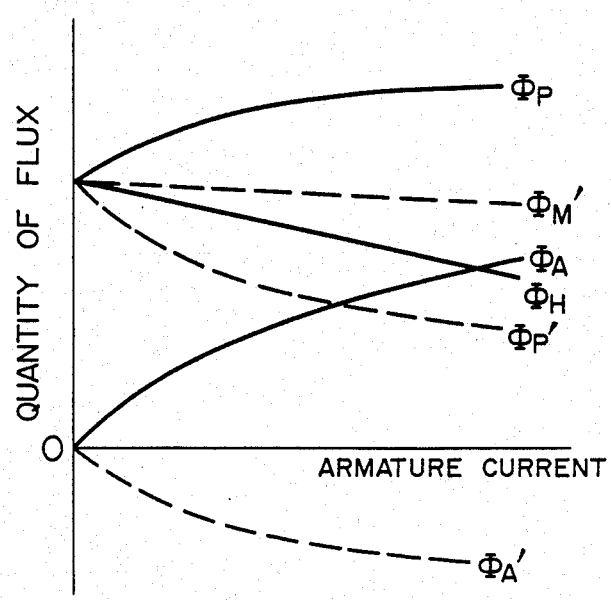
FIG. 4 is a graph showing the relation of an armature current and a quantity of flux acting on the armature coils.

FIG. 4 shows the relation of the flux quantity (ordinate) at various parts of the field versus the armature current (abscissa). In FIG. 4, the broken line expresses the prior art, and the solid line expresses the embodiment of the present invention.

In the motor of FIG. 1, each of the brush positions 11 is shifted from a position corresponding to the geometrically neutral point, so that, for example, the permanent magnet 9a and the auxiliary pole 8b act on the armature coils corresponding to one pole. Accordingly, the flux quantity $\Phi_M$ of the permanent magnet 9a decreases as the armature current increases due to the armature reaction On the other hand, the flux quantity of the auxiliary pole 8b increases proportionally to $\Phi_A$ of the auxiliary pole 8b increases proportionally to the armature current due to the armature reaction. As the result, the total flux quantity $\Phi_P$ (extending through the armature coils 4d to 4i), which is the sum of the flux quantity $\Phi_M$ of the permanent magnet 9a and the flux quantity $\Phi_A$ of the auxiliary pole 8b, has a finite value when the armature current is zero. The total flux quantity $\Phi_P$ increases as the armature current increases correspondingly. However, if each brush is disposed at a position corresponding to the geometrically neutral point like in the prior art, the auxiliary pole 8a and the permanent magnet 9a act on the armature coils extending over one field pole. As shown by the broken line in FIG. 4, the flux $\Phi_A$, of the auxiliary pole 8a has a negative value, reverse to the flux of the permanent magnet 9a. Accordingly, the total flux quantity $\Phi_P$, distributed over the armature coil 4a to 4g, which is the sum of the flux quantity $\Phi_M$, of the permanent magnet 9a and the flux quantity $\Phi_A$, of the auxiliary pole 8a, decreases as the armature current increases.

Figure 5:
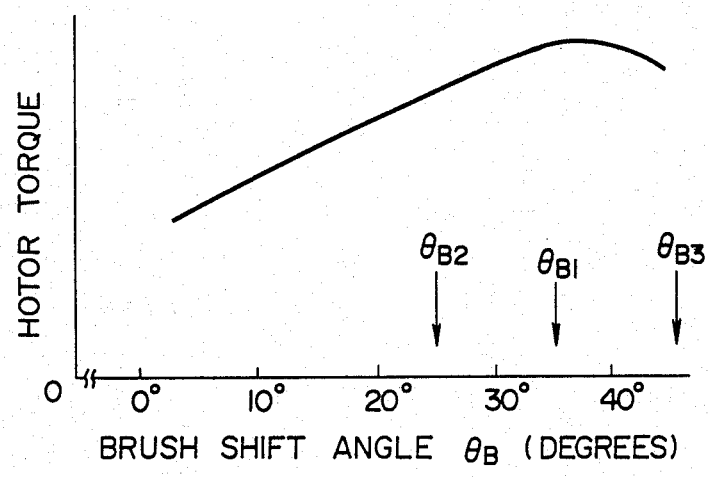
FIG. 5 is a graph showing the relation of the shifted angle of each brush and the generated torque in the DC electric motor of FIG. 1.

FIG. 5 shows a motor torque in the case where the four-pole motor of the field-pole construction of the present invention, in which the circumferential angular width $\theta_1$ of each auxiliary pole is 18 degrees (36 degrees in electrical angle) and the circumferential angular width $\theta_2$ of each permanent magnet is 52 degrees (104 degrees in electrical angle), is used as a starter motor and each of the brush positions is shifted in the direction of reverse rotation. In the drawing, the abscissa expresses the geometrical angle by which the brush is shifted in the direction of reverse rotation. When the brush position is shifted in the direction of reverse rotation by 35 degrees (70 degrees in electrical angle), the maximum motor torque can be attained. The maximum motor torque becomes two or more times as large as that in the case where $\theta_B$ is zero or in other words the brush is disposed at a position corresponding to the geometrically neutral point.

Although the aforementioned embodiment has shown the case where the invention is applied to a four-pole motor, it will be understood that the invention may be applied to any other multi-pole motor such as a two-pole motor, a six-pole motor, an eight-pole motor and the like. Further, the material for the permanent magnet is not limited specifically, but the magnet may be any of a ferrite magnet, a rare-earth magnet such as a samarium-cobalt magnet, a cerium-cobalt magnet and a neodymium-magnet, an iron-boron magnet, and a ferrite or rare-earth plastic magnet, etc. Although the embodiment of FIG. 1 has shown the case where the brush position is shifted by an angle $\theta_B = \theta_{B1}$ where torque becomes maximum as shown in FIG. 5, a satisfactorily large motor torque can be attained even by shifting the brush position by any angle within a range of from $\theta_{B2}$ to $\theta_{B3}$ as shown in FIG. 5. That is, when the shift angle $\theta_b$ is selected to be a value within a range of from 25 to 45 degrees (50 to 90 degrees in electrical angle), torque increases practically usefully, compared to that in the case the angle $\theta_B$ is zero. However, if the angle $\theta_B$ is selected to be smaller than 25 degrees (50 degrees in electrical angle) or larger than 45 degrees (90 degrees in electrical angle), torque does not increase sufficiently.

Although the above description has been made of the case where the DC electric motor is operated in the normally-used or forward direction of rotation, each of the brushes is moved to a position shifted by a few or 2 to 7 degrees in the direction of reverse rotation from the geometrically neutral point between a pair of adjacent field poles like in the prior art, if the motor is to be operated in the reverse direction of rotation. In this case, the auxiliary pole in each field pole is placed on the entry side of the field pole in the direction of rotation. Accordingly, in the viewpoint of armature reaction, the motor becomes equivalent to a conventional permanent magnet field DC electric motor with auxiliary poles, so that series-wound characteristics can be obtained.

To shift brushes, any known brush shifting mechanism may be used. The direction of rotation of the DC motor according to the present invention varies depending on the situation where the motor is used. In the case where the direction of rotation is not changed from the initial setting which is determined according to the specific use of the motor, it is sufficient to adjust the position of each brush once before the motor is set in the location where the motor is used, and therefore the brush shifting mechanism may be simple in construction as shown in FIG. 2. In FIG. 2, each brush 22 is held by a holder 21 fixed to an arm 23. The arm 23 is fixed to a ring 20 rotatably supported by a hub 27 integrally formed on the end bracket 6b at the inside thereof. A bolt 26 is provided so as to project from the ring 20 to extend to the outside of the bracket 6b through an arc-like slot 25 formed in the bracket 6b. The bolt 26 can be externally moved in the arc-like slot 25 so as to rotate the ring 20 to thereby adjust the position of the brush 22. After the adjustment of the brush position, the bolt 26 is fixed at that position by a nut 24. It is a matter of course that any suitable means other than the aforementioned brush shifting mechanism may be used in the invention. For example, the brush holder may be fixed to the end bracket which is made to be circumferentially movable relative to the yoke 7.

Figure 6:
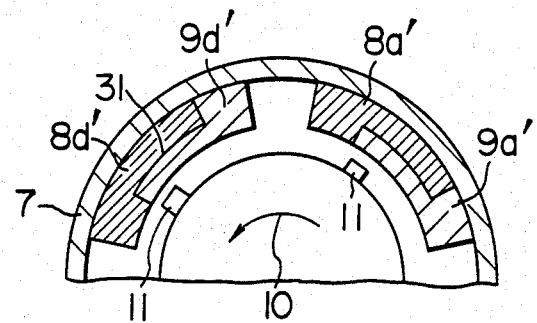
FIGS. 6, 7 and 8 are views showing various modifications of the embodiment of FIG. 1.
Figure 7:
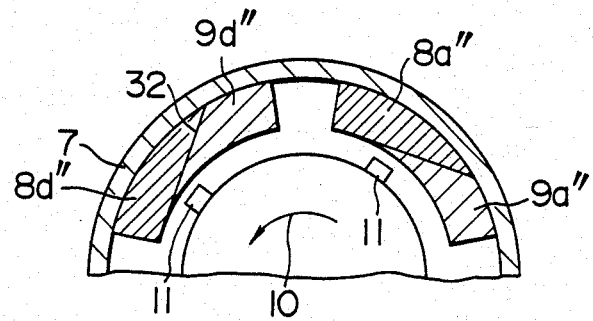

The shape in section of each of the auxiliary poles is not limited to such a trapezoid as shown in FIG. 1. For example, as shown in FIG. 6, the auxiliary pole may be L-shaped in section so that the auxiliary pole 8a', 8d' and the permanent magnet 9a', 9d', respectively are in contact with each other at a step-like boundary 31. Alternatively, as shown in FIG. 7, the auxiliary pole 8a'', 8d'', may be shaped like an irregular quadrilateral or triangle in section so that the auxiliary pole and the permanent magnet 9a''', 9d''', respectively are in contact with each other at a boundary 32 having a certain angle relative to the radial direction. In either case, the same effects as those in the foregoing embodiment can be obtained.

Figure 8:
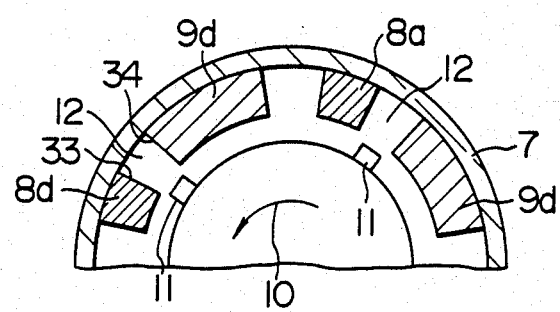

If each field pole is formed by arranging the end surface 33 of the auxiliary pole to face the end surface 34 of the permanent magnet circumferentially through a gap 12 as shown in FIG. 8, the range where the flux density is zero increases so that a well commutation characteristic can be obtained.

We claim:

1. A DC electric motor comprising:
 a rotor having an armature core, an armature winding and a commutator, and arranged to be selectively rotatable in one of a first direction and a second direction reverse to said first direction about a rotary axis;
 a stator having a yoke and a plurality of field poles provided on an inner circumference of said yoke, each of said field poles having a permanent magnet and an auxiliary pole disposed at an entry side of said field pole viewed in said first direction of rotation of said rotor;
 brush means including a plurality of brushes arranged for sliding movement on and in electrical contact with said commutator; and
 brush holding means for holding each of said brushes movable between a first position near a geometrically neutral point of a pair of adjacent field poles and a second position separated by an electrical angle within a range of 50 to 90 degrees from said geometrically neutral point in said first direction of rotation of said rotor, said brush holding means holding each of said brushes at said first position when said rotor is to be rotated in said first direction and at said second position when said rotor is to be rotated in said second direction.

2. A DC electric motor according to claim 1, in which said permanent magnet and said auxiliary pole of each field pole are in contact with each other at a boundary disposed on a plane containing said rotary axis and extending in the radial direction of said rotor.

3. A DC electric motor according to claim 1, in which said auxiliary pole and said permanent magnet in each of said field poles are in contact with each other at their end surfaces respectively formed like a step.

4. A DC electric motor according to claim 1, in which said auxiliary pole and said permanent magnet in each of said field poles have their end surfaces circumferentially facing each other with a gap therebetween.

5. A DC electric motor according to claim 1, in which said auxiliary pole and said permanent magnet in each of said field poles are in contact with each other at a boundary disposed on a plane extending with a predetermined angle relative to the radial direction of said stator.

6. A DC electric motor according to claim 1, in which said second direction of rotation of said rotor is the forward direction of rotation of said rotor.

7. A DC electric motor according to claim 1, wherein said second position is beyond a boundary of said auxiliary pole and said permanent magnet in each of said field poles in said first direction of rotation of said rotor.

* * * * *